United States Patent [19]
Brockway

[11] Patent Number: 5,137,158
[45] Date of Patent: Aug. 11, 1992

[54] ARTICLE SUPPORT APPARATUS

[76] Inventor: Ronald L. Brockway, 2523 N. Poinsettia, Santa Ana, Calif. 92706

[21] Appl. No.: 723,764

[22] Filed: Jul. 1, 1991

[51] Int. Cl.⁵ .............................................. A47F 5/00
[52] U.S. Cl. .................................... 211/87; 211/DIG. 1; 248/206.3; 248/206.5; 248/340
[58] Field of Search ................ 211/87, DIG. 1; 248/206.3, 206.5, 339, 340; 224/309

[56] References Cited

U.S. PATENT DOCUMENTS

| | | | |
|---|---|---|---|
| 1,995,246 | 3/1935 | Greims | 211/87 X |
| 2,990,065 | 6/1961 | Margolis | 211/87 |
| 3,118,207 | 1/1964 | Breslow | 248/206.5 X |
| 3,126,190 | 3/1964 | Miller | 248/206.5 |
| 3,239,179 | 3/1966 | Margolis | 211/87 X |
| 3,321,166 | 5/1967 | Gordon | 248/205.5 |
| 4,327,837 | 5/1982 | Ross | 211/87 |
| 4,828,303 | 5/1989 | Soria | 248/206.3 X |

Primary Examiner—Robert W. Gibson, Jr.
Attorney, Agent, or Firm—Leon Gilden

[57] ABSTRACT

An apparatus for mounting to an interior surface of a trunk lid or a forward interior wall of a truck bed for support and transport of various bag members thereon for the convenience of suspending the bags containing transportable articles therewithin. The apparatus includes a bar member mounting magnetic and suction members to provide selective securement to the trunk lid or truck bed wall respectively. A modification of the invention includes a framework, with the framework including an upper bar pivotally mounting magnet and suction cup members for their selective use, wherein a lower bar includes a plurality of hangers and the bar is provided with spaced "U" shaped recesses for receiving coat hanger members thereon for transport of garments.

11 Claims, 5 Drawing Sheets

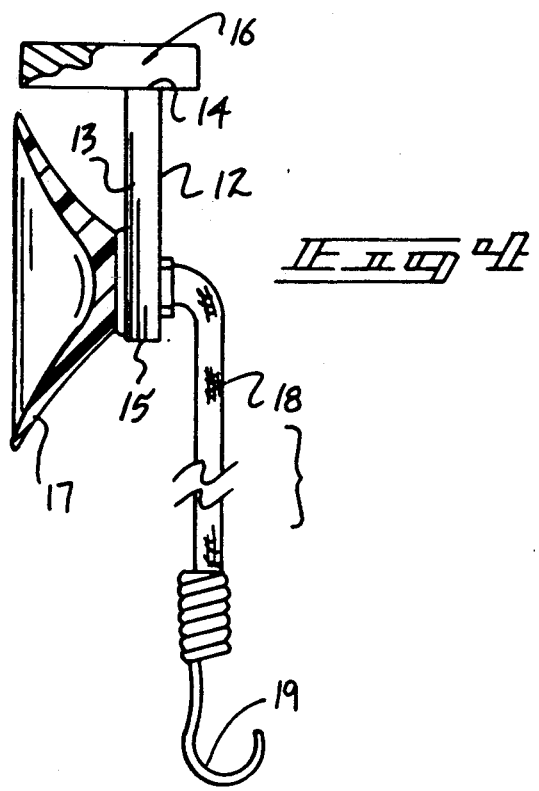
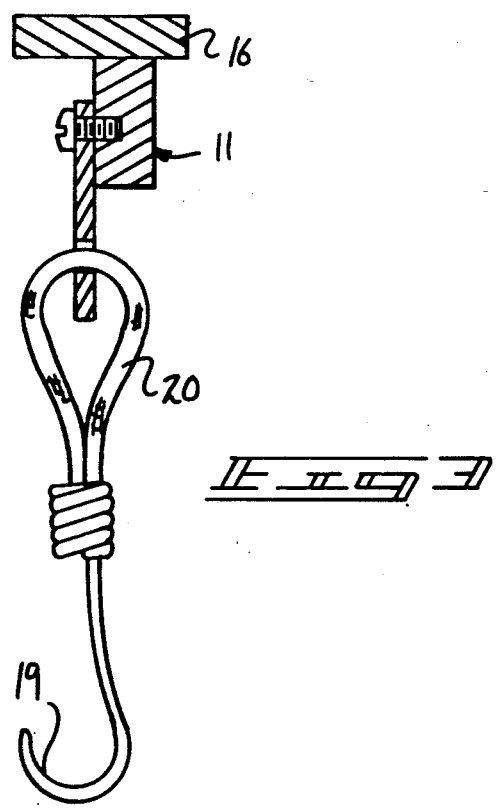

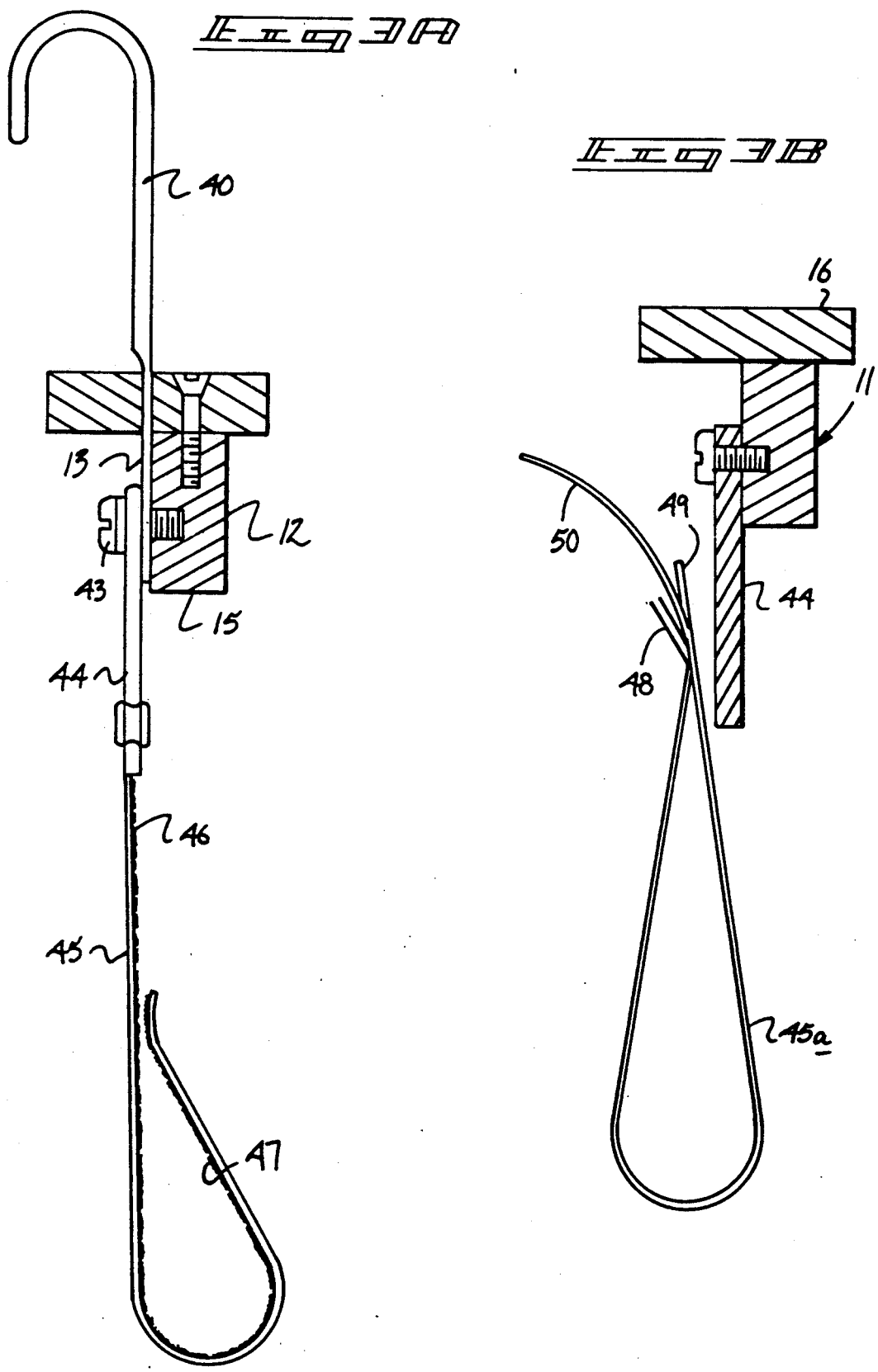

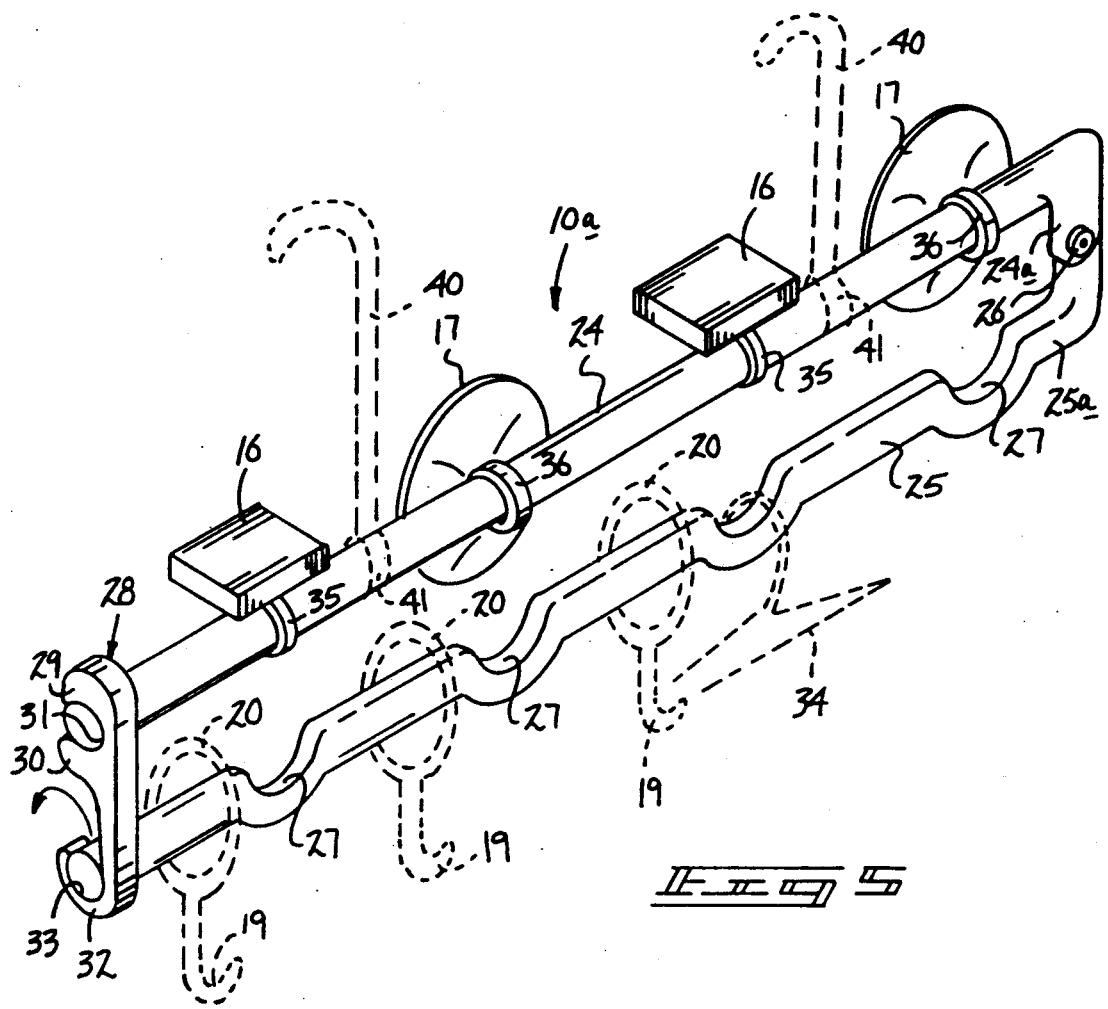
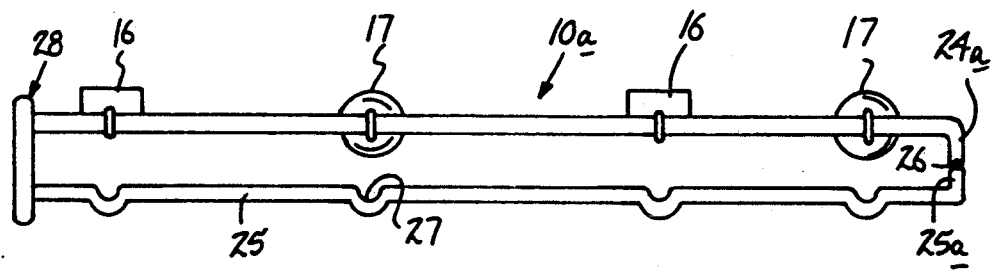

ARTICLE SUPPORT APPARATUS

BACKGROUND OF THE INVENTION

1. Field of the Invention

The field of invention relates to article support apparatus, and more particularly pertains to a new and improved article support apparatus wherein the same is arranged for securement to a Vehicular trunk lid or truck bed wall.

2. Description of the Prior Art

Support apparatus are available in the prior art in a variety of configurations for the mounting and transport of various components. Particularly such support apparatus is of a stationary configuration, as illustrated in U.S. Pat. No. 1,940,584 to Saussure, Jr. wherein a rack member includes hooks for support of Various articles thereon.

U.S Pat. No. 4,129,217 to Campbell sets forth a spray painting station Wherein a bar mounts a plurality of hooks for securement of components thereon for spraying purposes.

U.S Pat. No. 3,193,229 to Stock sets forth hanger construction for mounting to a gutter portion of a dwelling for supporting various articles thereon.

U.S. Pat. No. 4,848,713 to Adams sets forth an article support and hook member utilizing a suction cup for securement to a support surface.

As such, it may be appreciated that there continues to be a need for a new and improved article support apparatus as set forth by the instant invention which addresses both the problems of ease of use as well as effectiveness in construction in providing ease of mounting of the apparatus to a vehicular wall and in this respect, the present invention substantially fulfills this need.

SUMMARY OF THE INVENTION

In view of the foregoing disadvantages inherent in the known types of article support apparatus now present in the prior art, the present invention provides an article support apparatus wherein the same provides for a bar assembly selectively and securely mounted to an interior surface of a trunk lid or a forward wall of a truck bed. As such, the general purpose of the present invention, which will be described subsequently in greater detail, is to provide a new and improved article support apparatus which has all the advantages of the prior art article support apparatus and none of the disadvantages.

To attain this, the present invention provides an apparatus for mounting to an interior surface of a trunk lid or a forward interior wall of a truck bed for support and transport of various bag members thereon for the convenience of suspending the bags containing transportable articles therewithin. The apparatus includes a bar member mounting magnetic and suction members to provide selective securement to the trunk lid or truck bed wall respectively. A modification of the invention includes a framework, with the framework including an upper bar pivotally mounting magnet and suction cup members for their selective use, wherein a lower bar includes a plurality of hangers and the bar is provided with spaced "U" shaped recesses for receiving coat hanger members thereon for transport of garments.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved article support apparatus which has all the advantages of the prior art article support apparatus and none of the disadvantages.

It is another object of the present invention to provide a new and improved article support apparatus which may be easily and efficiently manufactured and marketed.

It is a further object of the present invention to provide a new and improved article support apparatus which is of a durable and reliable construction.

An even further object of the present invention is to provide a new and improved article support apparatus which is susceptible of a low cost of manufacture with regard to both materials and labor, and which accordingly is then susceptible of low prices of sale to the consuming public, thereby making such article support apparatus economically available to the buying public.

Still yet another object of the present invention is to provide a new and improved article support apparatus which provides in the apparatuses and methods of the prior art some of the advantages thereof, while simultaneously overcoming some of the disadvantages normally associated therewith Still another object of the present invention is to provide a new and improved article support apparatus wherein the same is readily mounted to a vehicular body portion in a selective manner to provide ease of transport of various articles relative to an associated self-propelled vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the suction cup and hook structure.

FIG. 3a is cross-sectional view of the support structure in a modified configuration mounting a hook and loop fastener strap in lieu of hook structure.

FIG. 3b is an orthographic cross-sectional view of the invention utilizing a flexible strap mounted to a support buckle relative to the framework of the invention.

FIG. 4 is an orthographic cross-sectional view of a further hook structure.

FIG. 5 is an isometric illustration of a modified aspect of the invention.

FIG. 6 is an orthographic front view of the invention as set forth in FIG. 6.

DESCRIPTION OF THE PREFERRED EMBODIMENT

Figure 1:
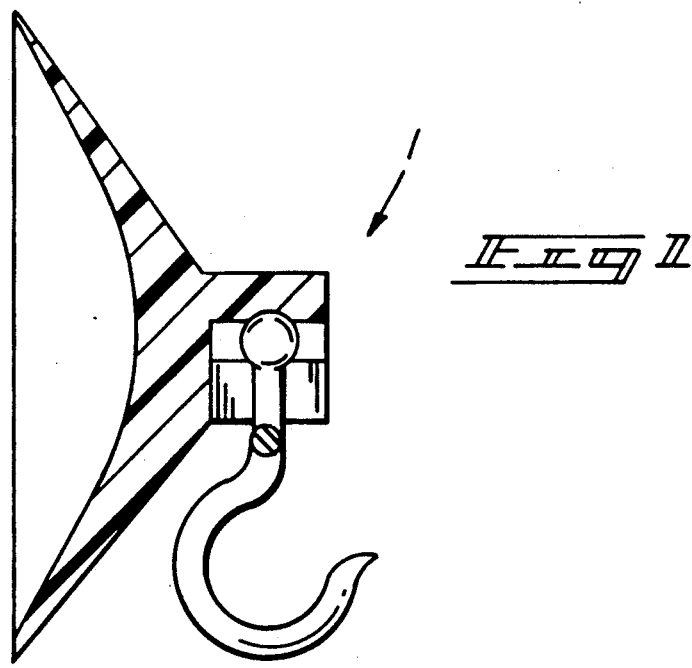
FIG. 1 is a prior art 5 hook apparatus.
Figure 2:
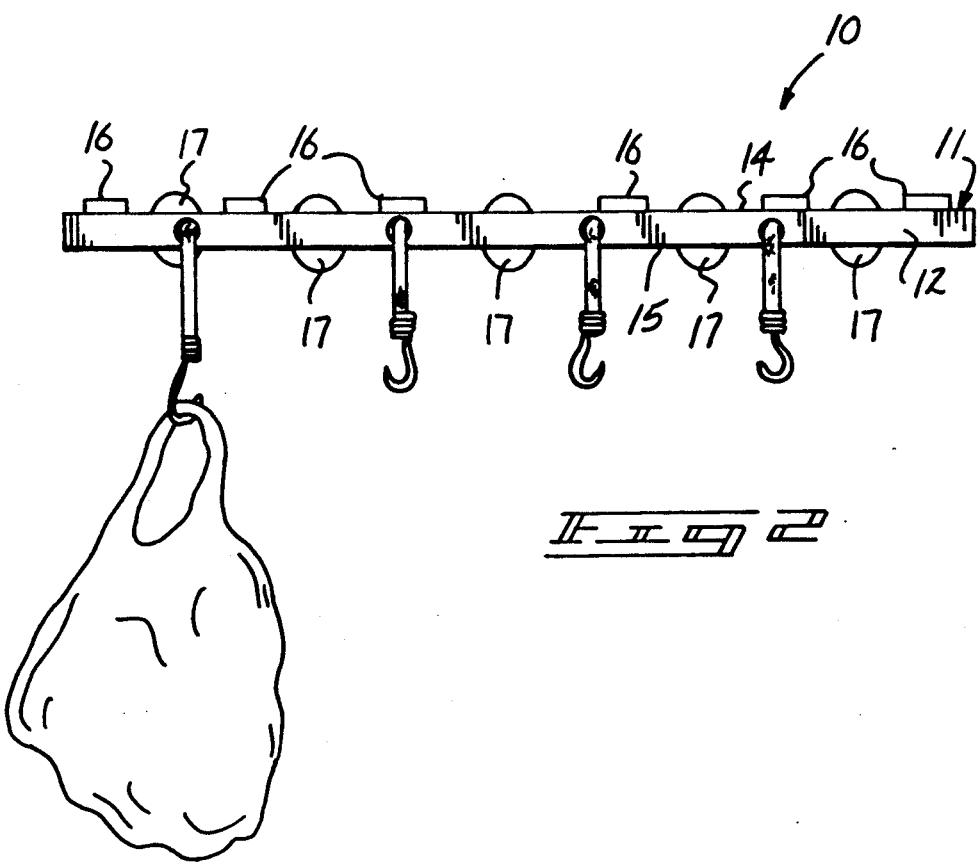
FIG. 2 is an orthographic front view of the invention.

With reference now to the drawings, and in particular to FIGS. 1 to 8 thereof, a new and improved article support apparatus embodying the principles and concepts of the present invention and generally designated by the reference numeral 10 will be described.

FIG. 1 illustrates a prior art article support apparatus 1, as set forth in U.S. Pat. No. 4,848,713, utilizing a hook member mounted to a suction cup arrangement.

Figure 8:
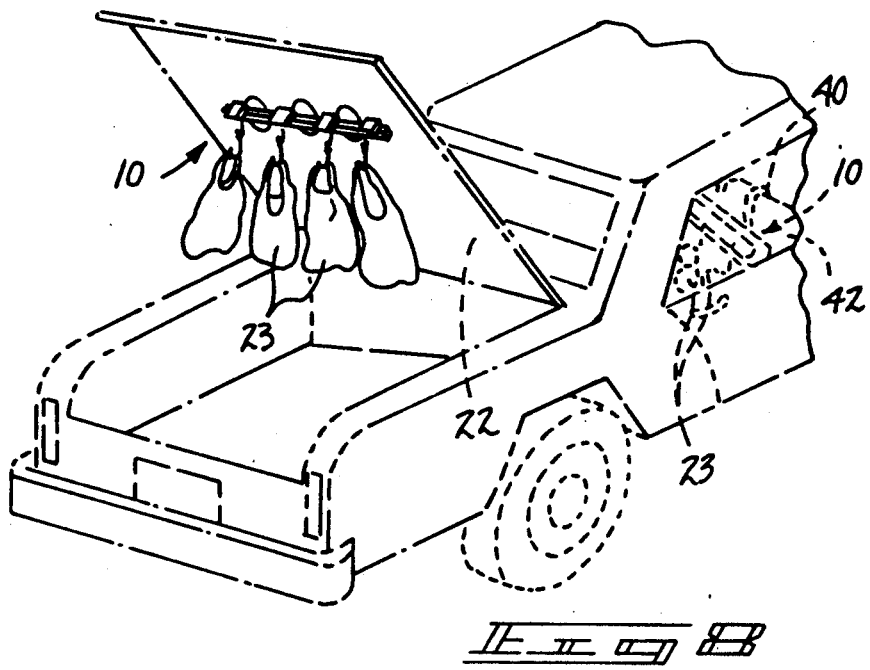
FIG. 8 is an isometric view of the apparatus mounted to an interior surface of a trunk lid.
Figure 7:
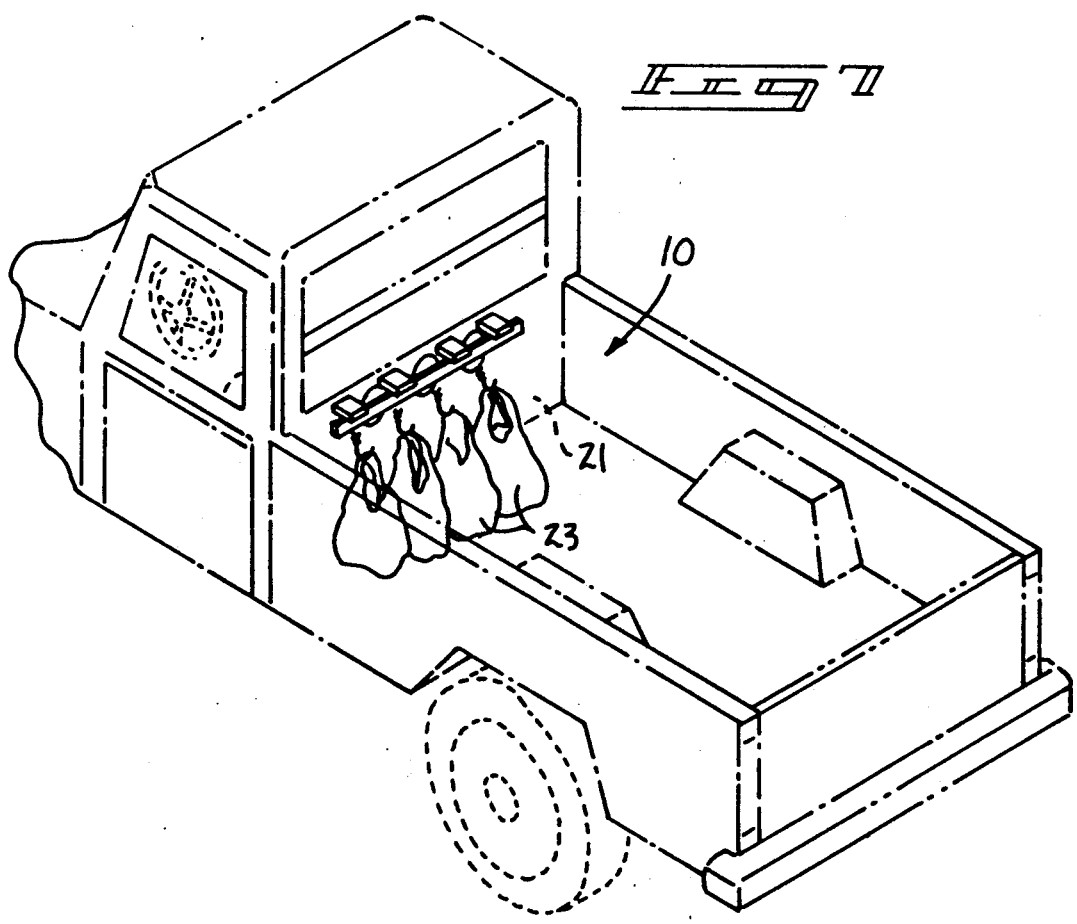
FIG. 7 is an isometric view of the invention mounted to a forward vertical wall of a truck bed.

More specifically, the article support apparatus 10 of the instant invention essentially comprises a rigid bar 11 formed with a bar front wall 12, a bar rear wall 13, a bar top wall 14, and a bar bottom wall 15. A plurality of equally spaced bar magnet members 16 are mounted fixedly to the top wall 14, with a plurality of suction cup members 17 mounted intermediate spaced bar magnet members 16. The bar magnet members 16 permits securement of the bar 11 to an interior surface of the trunk lid, as illustrated in FIG. 8, whereas the suction cup members 17 permit securement of the organization selectively to a vertical surface of a truck bed wall, as illustrated in FIG. 7. The bar member 11 includes a plurality of spaced flexible straps 18 mounted to the front wall 12, in a manner as depicted in FIGS. 3 and 4, utilizing either a strap loop 20 or a unitary flexible strap 18, each formed with a hook 19 at a lower terminal end thereof. It should be noted that the flexible strap 18, as well as the strap loops 20, are formed of an elastomeric material to accommodate vibration during transport of the bag members 23 mounted to the hooks 19. The forward wall of the truck bed 21, as well as the interior surface 22 of the trunk lid, as depicted in FIGS. 7 and 8 respectively, are subject to vibration and the like during transport and usage of the vehicle mandating the use of elastomeric straps as described.

FIGS. 5 and 6 illustrate the use of a modified support apparatus 10a, including a top rod 24 positioned above a bottom rod 25. The top rod 24 includes a rear vertical leg 24a that is oriented orthogonally and fixedly to a first end of the top rod 24 pivotally mounted to a bottom rod rear vertical leg 25a that is orthogonally mounted to a first terminal end of the bottom rod 25. The legs 24 and 25 are pivotally mounted to one another by use of a pivotal axle 26 orthogonally directed relative to the legs 24 and 25 to permit their relative pivotment.

The bottom rod 25 includes a plurality of spaced "U" shaped recesses 27, as illustrated. The "U" shaped recesses 27 are arranged to receive a hanger hook of an associated clothing hanger 34, wherein the hanger hook is mounted to an upper terminal apex of a hanger triangular framework, as illustrated, for transport of various garments of clothing. Further, the strap loops 20 are slidably mounted about the bottom rod 25 and positioned as required, displaced from the recesses 27, wherein the elastomeric and polymeric construction frictionally engages the bottom rod 25 to permit relative positioning during use and support of a bag member 23 on an associated hook 19.

The top and bottom rods 24 and 25 each include respective second terminal ends, wherein the second terminal ends are mounted within a connector bar 28. The connector bar 28 is orthogonally oriented relative to the top and bottom rods 24 and 25 respectively, and includes a first jaw 29 spaced from a second jaw 30 defining a first clamping cavity 31 to secure the second terminal end of the top rod in a fixed manner. A third "J" shaped jaw 32 is positioned below the first and second jaws 29 and 30 providing a support recess 33 that releasably mounts the second terminal end of the bottom rod 25 to permit removal of the bottom rod relative to the support recess 33. Accordingly, this permits additional strap loops to be removed or added to the bottom rod 25 as required for either maintenance or need.

The bar magnets 16 are pivotally mounted to the top rod 24 by first pivot loops 35 that circumferentially engage the top rod 25 utilizing a plurality of suction cup members 17 mounted to second pivot loops 36 that circumferentially engage the top rod 24. Pivotment of the organization permits the magnets or suction cups to accommodate various angularities of the support surface in use and permits their positioning relative to the top rod 24 to orient the magnets 16 or the suction cups 17 as required.

FIG. 3a illustrates the bar 11 mounting a plurality of seat hanger hooks 40 (as illustrated in FIG. 5 for example) and mounted to the bar rear wall 13 along with a strap flange 14 that is in contiguous communication with the rear wall 13 and extending downwardly therefrom below the bottom wall 15. A fastener 43 directed through the strap flange 44 and the seat hanger hook 40 assembles the organization together. In contrast, the seat hanger hooks 40 may be mounted to hanger hook support loops 41, as illustrated in FIG. 5, to permit pivotment of the set hanger hooks 40 relative to the top rod 24 in a construction as set forth in FIG. 5.

A flexible strap 45 is mounted by means of a fastener 43 through the rear wall 13 and extends downwardly therefrom to include a first hook and loop fastener surface 46 cooperative with a second hook and loop fastener surface 47 to permit securement of various bag structures in the loop created by the securement of the second hook and loop fastener surface or the first hook and loop fastener surface. Alternatively, a support clip 48 may be mounted to the rear wall 13 to support a modified flexible strap 45a that includes a strap fixed end 49 cooperative with a strap free end 50. In this manner, the clip may permit adjustment of the loop by directing the free end 50 relative to the fixed end 49 through the clip 48 to secure a bag thereon. FIG. 8 illustrates the seat hanger hooks 40 in association with an automotive vertical seat member 42 for support of a plurality of bags therefrom utilizing any of the support strap members or hooks, as directed by the invention.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An article support apparatus, comprising in combination,
   a bar member, the bar member mounting a plurality of equally spaced bar magnet members secured to the bar member, and
   the bar member further including a plurality of suction cup members mounted to the bar member, and
   the bar member further including a plurality of elastomeric flexible strap loops secured to the bar member, wherein each of the elastomeric strap loops includes a hook mounted at a lower terminal end of each of the strap loops.

2. An apparatus as set forth in claim 1 wherein the bar member includes a top rod, the top rod including a first top rod end and a second top rod end, the first top rod end including a first leg orthogonally mounted to the top rod first end, and the bar member further including a bottom rod, the bottom rod including a bottom rod first end, and a second leg orthogonally mounted to the bottom rod first end, the first leg orthogonally mounted to the top rod, and the second leg orthogonally mounted to the bottom rod, and the first leg and the second leg pivotally mounted relative to one another, including a pivot axle orthogonally directed through the first leg and the second leg to permit pivotment of the first leg relative to the second leg.

3. An apparatus as set forth in claim 2 wherein the top rod includes the bar magnet members mounted pivotally thereto, each bar magnet member including a first pivot loop circumferentially surrounding the top rod to permit pivotment of each bar magnet member relative to the top rod, and the suction cup members pivotally mounted to the top rod, each suction cup member including a second pivot loop circumferentially surrounding the top rod for pivotally mounting each suction cup member to the top rod.

4. An apparatus as set forth in claim 3 wherein the bottom rod includes a plurality of equally spaced "U" shaped recesses, the "U" shaped recess including a hanger member mounted thereto, each hanger member including a hanger hook positioned within the "U" shaped recess, and the hanger hook including a triangular frame, with the hanger hook fixedly mounted at an upper apex portion of the triangular frame for supporting a garment thereon.

5. An apparatus as set forth in claim 4 wherein the strap loops are mounted surroundingly relative to the bottom rod between the "U" shaped recesses.

6. An apparatus as set forth in claim 5 wherein the top rod includes a top rod second end spaced from the top rod first end, and the bottom rod includes a bottom rod second end spaced from the bottom rod first end, and further including a connector bar orthogonally mounted to the top rod receiving the top rod first end therewithin, the connector bar including a first jaw and a second jaw defining a first clamping cavity between the first jaw and the second jaw, wherein the first clamping cavity fixedly secures the top rod second end therewithin.

7. An apparatus as set forth in claim 6 wherein the connector bar includes a third "J" shaped jaw positioned below the first jaw and the second jaw, wherein the third "J" shaped jaw defines a support recess, wherein the support recess is in a confronting relationship relative to the second jaw and the support recess removably mounts the bottom rod second end therewithin.

8. An apparatus as set forth in claim 7 wherein the top rod includes a plurality of support loops pivotally mounted about the top rod, and each support loop includes a seat hanger hook, each seat hanger hook projects orthogonally and above the top rod for securement to a vertical seat member of an associated automotive seat within the passenger compartment of an associated automobile.

9. An apparatus as set forth in claim 1 wherein the support member includes a strap flange mounted to a rear wall of the bar member, the strap flange mounting a flexible strap therefrom.

10. An apparatus as set forth in claim 9 wherein the strap includes a fixed end mounted to the strap flange and a free end selectively securable to the flexible strap relative to the fixed end, and wherein the flexible strap includes a first hook and loop fastener surface cooperative with a second hook and loop fastener surface for securement of the free end relative to the fixed end.

11. An apparatus as set forth in claim 9 wherein the strap flange includes a support clip, the support clip includes the flexible strap therefrom and the flexible strap includes a fixed end fixedly secured to the clip and a free end slidably directed through the clip.

* * * * *